United States Patent
Bakan et al.

(10) Patent No.: US 9,771,994 B2
(45) Date of Patent: Sep. 26, 2017

(54) WET FRICTION MATERIALS INCLUDING CRISTOBALITE AS FILLER MATERIAL

(71) Applicant: Schaeffler Technologies AG & Co. KG, Herzogenaurach (DE)

(72) Inventors: Murat Bakan, Puebla (MX); Rashid Farahati, Copley, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/934,207

(22) Filed: Nov. 6, 2015

(65) Prior Publication Data

US 2017/0130793 A1    May 11, 2017

(51) Int. Cl.
    F16D 69/00    (2006.01)
    F16D 69/02    (2006.01)
(52) U.S. Cl.
    CPC .................................. *F16D 69/028* (2013.01)
(58) Field of Classification Search
    CPC . C09K 3/14; F16D 69/00; F16D 69/02; F16D 69/028
    See application file for complete search history.

(56) References Cited

U.S. PATENT DOCUMENTS

| | | | |
|---|---|---|---|
| 2,938,790 A | 5/1960 | Stedman et al. | |
| 5,585,166 A | 12/1996 | Kearsey | |
| 5,721,332 A * | 2/1998 | Kano | C08G 8/04 528/129 |
| 6,316,086 B1 | 11/2001 | Beier et al. | |
| 6,586,373 B2 | 7/2003 | Suzuki et al. | |
| 6,872,770 B2 | 3/2005 | Shah | |
| 8,367,767 B1 | 2/2013 | Jafri et al. | |
| 2009/0020383 A1 | 1/2009 | Hanna et al. | |
| 2010/0084232 A1 | 4/2010 | Subramanian | |
| 2011/0036675 A1 * | 2/2011 | Agarwal | F16F 7/00 188/381 |
| 2012/0149808 A1 * | 6/2012 | Hajek | C08J 5/045 524/17 |
| 2014/0038861 A1 * | 2/2014 | Epshteyn | C01G 39/06 508/108 |
| 2014/0171305 A1 | 6/2014 | Nannini et al. | |

FOREIGN PATENT DOCUMENTS

| | | | |
|---|---|---|---|
| CN | 101759383 A | * | 6/2010 |
| CN | 102134371 A | * | 7/2011 |
| CN | 102285776 A | * | 12/2011 |
| CN | 102506107 A | * | 6/2012 |
| CN | 103739243 A | * | 4/2014 |
| CN | 104140784 A | * | 11/2014 |
| CN | 104164211 A | * | 11/2014 |
| EP | 1818359 A1 | * | 8/2007 |
| JP | 60-190448 A | * | 9/1985 |
| JP | 08-092487 | * | 4/1996 |
| JP | 2002-308669 A | * | 10/2002 |

OTHER PUBLICATIONS

Goresil 210, Product Data Sheet; www.cedprocessminerals.com; 2006-2009 C.E.D. Process Minerals Inc.
International Search Report and Opinion for PCT/US2016/060540; 9 pgs; mailed Feb. 13, 2017 by Korean Intellectual Property Office.

* cited by examiner

*Primary Examiner* — Anthony J Green
(74) *Attorney, Agent, or Firm* — Kevin L. Parks; LeKeisha M. Suggs

(57) ABSTRACT

A friction material for a clutch comprising a plurality of fibers and a filler material including crystalline silica. The crystalline silica is cristobalite in an example aspect. A friction material for a clutch comprising: a plurality of fibers; and, a filler composition including: an amorphous silica-containing material; and, a plurality of crystalline silica particles, said particles having a Mohs hardness at least 6 and characterized by a rounded morphology. A friction material for a clutch comprising: a plurality of fibers; a filler composition including: diatomaceous earth; and, cristobalite including a plurality of particles characterized by a median particle size in a range from about 0.5 μm to about 5 μm; and, a resin; and, the friction material includes cristobalite in a range of from about 2% to about 20% by weight based on total weight of the friction material and has a static friction coefficient of at least 0.115.

1 Claim, 4 Drawing Sheets

WET FRICTION MATERIALS INCLUDING CRISTOBALITE AS FILLER MATERIAL

FIELD

The present disclosure relates generally to a wet friction material for clutch pads, in particular, a wet friction material with a higher friction coefficient.

BACKGROUND

Known friction material for clutches is composed of fiber material and filler material. The fiber material forms the structure of the friction material and the filler material creates friction. Known friction material uses diatomaceous earth for the filler material. Typically, diatomaceous earth is composed of 80 to 90% silica. It is desirable to increase both static and dynamic friction coefficients for friction material. It is particularly desirable to increase the dynamic friction coefficient.

BRIEF SUMMARY

Example aspects broadly comprise a friction material for a clutch comprising: a plurality of fibers; and, a filler material including crystalline silica. In an example aspect, the crystalline silica is cristobalite. In an example aspect, the cristobalite includes a plurality of particles characterized by a rounded morphology. In an example aspect, the median particle size of said particles is at most 8 µm. In an example aspect, the median particle size of said particles is in a range from about 0.5 µm to about 5 µm. In an example aspect, the median particle size of said particles is in a range from about 1 µm to about 3 µm. In an example aspect, the filler material includes a silica-containing material other than crystalline silica. In an example aspect, the filler includes at most 60% by weight crystalline silica based on total weight of the filler. In an example aspect, the filler includes crystalline silica in a range of from about 1% to about 60% by weight based on total weight of the filler. In an example aspect, the filler includes crystalline silica in a range of from about 5% to about 45% by weight based on total weight of the filler. In an example aspect, the filler includes crystalline silica in a range of from about 5% to about 15% by weight based on total weight of the filler. In an example aspect, the friction material further comprises a resin. In an example aspect, the friction material includes at most 20% by weight cristobalite based on total weight of the friction material. In an example aspect, the friction material includes cristobalite in a range of from about 1% to about 20% by weight based on total weight of the friction material. In an example aspect, the friction material includes cristobalite in a range of from about 2% to about 17% by weight based on total weight of the friction material. In an example aspect, the friction material includes cristobalite in a range of from about 2% to about 5% by weight based on total weight of the friction material.

Other example aspects broadly comprise a friction material for a clutch comprising: a plurality of fibers; and, a filler composition including: an amorphous silica-containing material; and, a plurality of crystalline silica particles, said particles having a Mohs hardness at least 6 and characterized by a rounded morphology. In an example aspect, the median particle size of said particles is in a range from about 0.5 µm to about 5 µm. In an example aspect, the filler composition includes at least 40% by weight amorphous silica material and at most 60% by weight crystalline silica based on total weight of the filler.

Other example aspects broadly comprise a friction material for a clutch comprising: a plurality of fibers; a filler composition including: diatomaceous earth; and, cristobalite including a plurality of particles characterized by a median particle size in a range from about 0.5 µm to about 5 µm; and, a resin; and, the friction material includes cristobalite in a range of from about 2% to about 20% by weight based on total weight of the friction material and has a static friction coefficient of at least 0.115.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. It should be appreciated that the term "substantially" is synonymous with terms such as "nearly", "very nearly", "about", "approximately", "around", "bordering on", "close to", "essentially", "in the neighborhood of", "in the vicinity of", etc., and such terms may be used interchangeably as appearing in the specification and claims. Although any methods, devices or materials similar or equivalent to those described herein can be used in the practice or testing of the invention, the following example methods, devices, and materials are now described.

The following description is made with reference to FIGS. 1-4.

Figure 1:
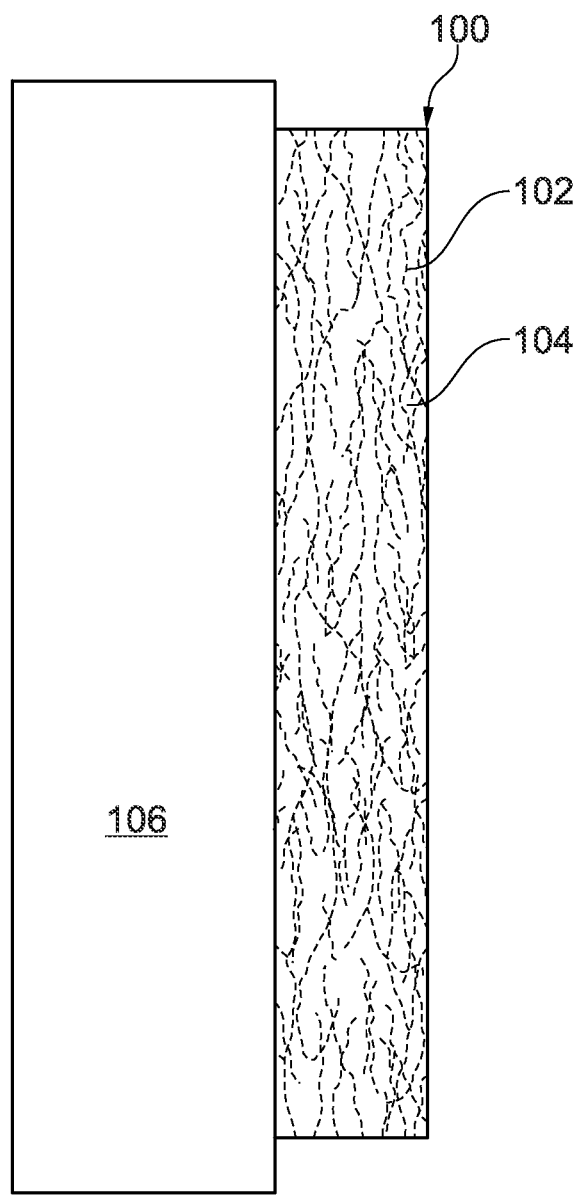
FIG. 1 is a schematic cross-sectional view of friction material including crystalline silica.

In an example aspect, a friction material for a clutch comprises a plurality of fibers and a filler material including crystalline silica. FIG. 1 is a schematic cross-sectional view of friction material 100 including crystalline silica. In an example aspect, the crystalline silica is cristobalite. Friction material 100 can be used on any clutch plate 106 known in the art. In an example embodiment, friction material is fixedly secured to plate 106. Friction material 100 includes fiber material 102 and filler material 104 including cristobalite. Friction material 100 further includes binder (not shown), such as phenolic resin or latex. Fiber material 102 can be any organic or inorganic fiber known in the art, for example including but not limited to cellulose, cotton, or carbon fibers.

In an example aspect, filler material 104 includes at least one silica-containing material. In an example aspect, filler material 104 further includes at least one silica-containing material other than crystalline silica or cristobalite. Any silica-containing material known in the art can be used. In an example embodiment, the silica-containing material includes, but is not limited to: Celite®, Celatom®, diatomaceous earth or silicon dioxide. Typically diatomaceous earth is amorphous and contains trace amounts, if any, of crystalline silica.

In an example aspect, to increase the dynamic friction coefficient for wet friction materials, a crystalline silica such as cristobalite is added as filler component to a wet friction material. Crystalline silica is a basic component of soil, sand, granite, and many other minerals. Quartz is the most common form of crystalline silica. Cristobalite and tridymite are two other forms of crystalline silica. All three forms may become respirable size particles when workers chip, cut, drill, or grind objects that contain crystalline silica; therefore, care in handling is required. Cristobalite silica is a form of silicon dioxide that occurs naturally and that can also be produced artificially by heating quartz sand in a kiln.

Cristobalite silica is a polymorph of quartz. In other words, cristobalite has the same chemical formula $SiO_2$ as quartz but a different crystal structure. Cristobalite generally refers to alpha cristobalite having tetragonal symmetry. A higher temperature phase called beta cristobalite is also known, characterized by octahedron crystals, but easily converts to alpha cristobalite upon cooling. Cristobalite silica is referred to interchangeably herein as 'cristobalite', 'cristobalite silica', 'alpha cristobalite', and more generally as 'crystalline silica' or '$SiO_2$'. Cristobalite silica is commercially available, for example, as "GoreSil®" or "CristolBrite™" from C.E.D. Process Minerals, Inc., of Akron, Ohio, USA. Characteristics of cristobalite useful as a filler in wet friction materials include the following properties and characteristics: low refractive index (i.e. 1.48), crystal surface terminates with siloxane groups, rounded particle geometry, high Mohs hardness (i.e. 6.5), high coefficient of thermal expansion, non-reactive or inert, low oil absorption, and low moisture content. Cristobalite silica is known to have different crystal structure, refractive index, density, hardness, coefficient of thermal expansion, and surface composition from other forms of silica. It is believed that the surface composition causes cristobalite silica to pick up less moisture than other mineral powders. In an example embodiment, the cristobalite has a water content of less than one percent by weight or volume.

Figure 2:
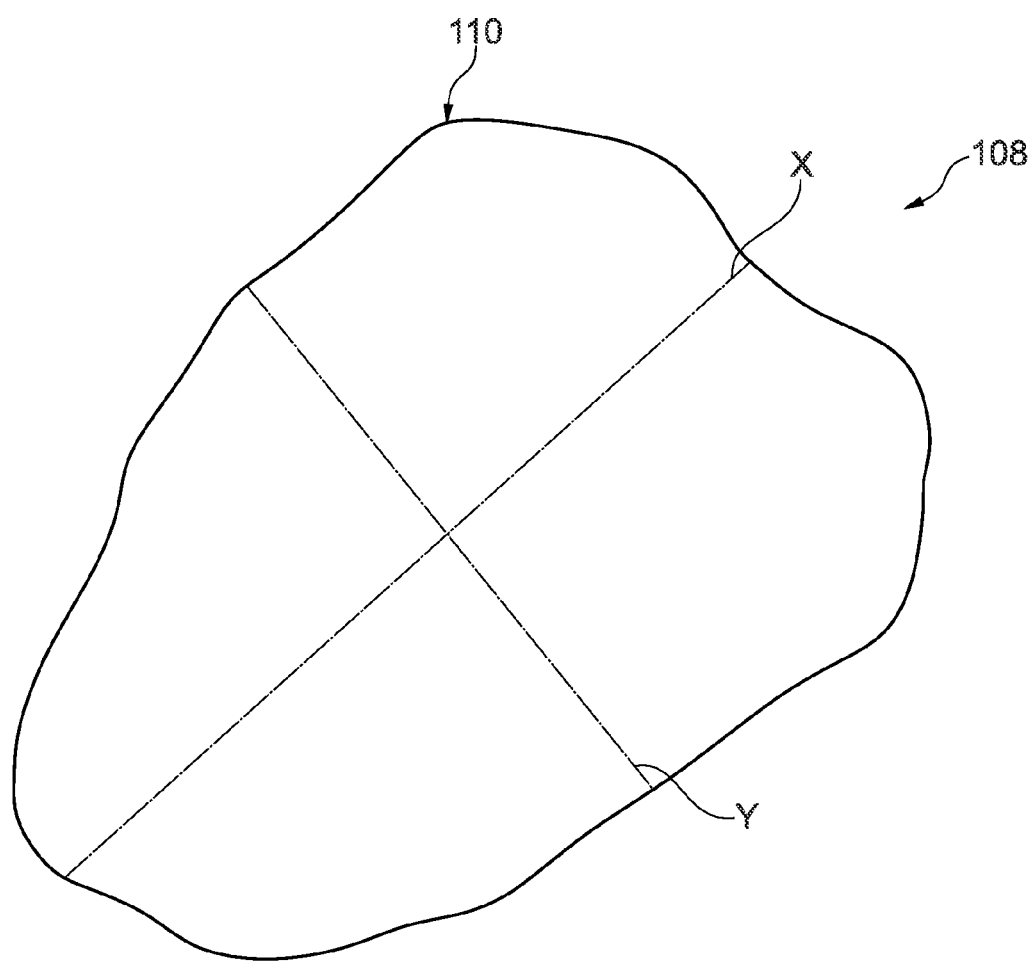
FIG. 2 is a schematic representation of a rounded particle of cristobalite useful as filler material; and, FIG. 3 is a cross-sectional view of a torque converter having friction material according to an example aspect; and, FIG. 4 is a graph plotting respective friction coefficients versus speed for known friction material and friction material including cristobalite.

In an example aspect, crystalline silica or cristobalite includes a plurality of particles characterized by a rounded morphology. By rounded particle geometry, also referred to as rounded particle shape or rounded morphology herein, it is meant that the cristobalite particles have at least one rounded surface or that most of the over-all form looks rounded. FIG. 2 is a schematic representation of rounded particle 108 of filler material 104. In an example embodiment, at least a portion of filler material 104 is in the form of rounded particles 108. For example, filler material 104 includes cristobalite in the form of rounded particles 108. In an example embodiment, a majority of the cristobalite in filler material 104 is in the form of rounded particles 108. In an example embodiment, all of the cristobalite in filler material 104 is in the form of rounded particles 108.

Each rounded particle 108 is substantially round and has a boundary 110. For example, boundary 110 may be circular, or semi-circular, or in the form of a smooth arc(s). Rounded particles may be at least partially irregular in shape, in other words, the rounded particles need not be regular or spherical. The aspect ratio denotes the ratio of axis X to axis Y. Wherein a spherical particle has an aspect ratio of 1 (or 1:1) and a fiber has an aspect ratio of greater than about 20 (or 20:1), for example, rounded particles useful as filler material 104 have an aspect ratio in the range from about 1 to about 4 (or from about 1:1 to about 4:1).

Cristobalite silica is commercially obtainable as a powder of various particle size distributions. Suitable cristobalite silica powders may be sufficiently fine so that 98% or more by weight of the powder will pass through a 100-mesh screen; as disclosed in Specification E-11-01, published by the American Society for Testing and Materials, a 100-mesh screen has a nominal opening size of 150 micrometers (μm). In an example aspect, cristobalite silica powders have 95% or more passing through a 325-mesh screen, which has a nominal opening size of 45 μm is used. In an example aspect a powder with a median particle size of at most 8 μm and a top particle size of 35 μm or less is used; in an example aspect a powder with median particle size of 0.5 to 5 μm and a top particle size of 25 μm or less is used, and in yet another example aspect a powder with median particle size of 1 to 3 μm and a top particle size of 10 μm or less is used. In other words, in an example aspect the median particle size of said particles is in a range from about 0.5 μm to about 5 μm; and in another example aspect the median particle size of said particles is in a range from about 1 μm to about 3 μm.

The particle size distribution (PSD) of cristobalite may be defined by a lower endpoint D10, an average particle size, a median particle size D50, and an upper endpoint D90. The D50, the median, is defined as the diameter where half of the population lies below this value. Similarly, 90% of the distribution lies below the D90, and 10% of the population lies below the D10. The relationship (D90–D10)/D50 is usually referred to as the span, and the D values are measured by sieving granulometry or other methods as known in the art. In an example aspect, cristobalite having a D value span in the range of from about 2.0 to about 2.4 is used as filler material.

In an example aspect, the upper endpoint D90 of the PSD of the cristobalite particles is about 6.2 μm, the median particle size of the cristobalite particles D50 is equal to or greater than about 2.4 μm, and the lower endpoint D10 of the PSD of the cristobalite particles is equal to or greater than about 1.0 μm. The particle size for an irregularly-shaped particle is generally understood by those skilled in the art in terms of the equivalent spherical diameter (ESD). In other words, the ESD of a non-spherical or irregularly shaped particle is equated to the diameter of a sphere of equivalent volume. The particle size of the majority of crystalline silica or cristobalite particles, in an example aspect, is in a range from about 1.0 to about 6.2 μm as defined by the D10 and D90 endpoints.

In an example aspect, filler 104 includes at most 60% by weight crystalline silica based on total weight of the filler. In an example aspect, filler material 104 is between 1 and 60 percent by weight cristobalite based upon the total weight of filler material 104. In another example aspect, friction material 100 is between 1 and 20 percent by weight cristobalite based upon the total weight of friction material 100. In an example aspect, filler material comprising a silica-rich material such as diatomaceous earth filler is at least partially substituted with cristobalite as filler material for friction material in a range from about 1 to about 60% by weight based upon the total weight of the filler material. It is not desirable to completely replace the diatomaceous earth filler with cristobalite because the overall porosity of the filler would be reduced causing adverse effects. Also, as crystalline silica requires special handling to ensure health and safety of handlers, it is desired to use the minimum amount to yield effective results. A suitable amount of crystalline silica or cristobalite is at least 1 to at most 60% by weight based on the total weight of the filler material in an example aspect, at least 5 to at most 60% in another example aspect, at least 5 to at most 45% in another example aspect, and at least 5 to at most 30% in another example aspect, and at least 5 to at most 15% in another example aspect, and at least 5 to at most 10% in yet another example aspect.

In an example aspect, friction material 100 includes at most 20% by weight cristobalite based on total weight of friction material. Wherein an example formulation for friction material includes equal amounts by weight of fiber, filler, and resin components, the cristobalite content in friction material is in a range from about 1 to about 20% by weight based on the total weight of the friction material. A suitable amount of cristobalite is at least 1 to at most 20% by weight based on the total weight of the friction material in an example aspect; at least 2 to at most 20% in another example aspect, at least 2 to at most 17% in another example aspect, at least 2 to at most 15% in another example aspect, at least 2 to at most 10% in another example aspect, and at least 2 to at most 5% in yet another example aspect.

In an example aspect, friction material 100 for a clutch comprises: plurality of fibers 102; and, a filler composition 104 including: an amorphous silica-containing material; and, a plurality of crystalline silica particles, said particles having a Mohs hardness at least 6 and characterized by a rounded morphology. In an example aspect, the median particle size of said particles is in a range from about 0.5 μm to about 5 μm. In an example aspect, filler composition 104 includes at least 40% by weight amorphous silica material and at most 60% by weight crystalline silica based on total weight of the filler.

In an example aspect, a sample composition wherein half or 50% of the diatomaceous earth filler conventionally used as filler is replaced by cristobalite additions yields a friction material having a crystalline silica or cristobalite content of about 17% by weight based on the total weight of the friction material. In an example aspect herein, the non-limiting cristobalite example GoreSil® 210 is used as a component material in a filler for friction material.

Example 1 material 100 includes 50 percent filler, 50 percent cellulose fiber, and a latex binder. Percentages are by weight. The filler is 100% diatomaceous earth as is known in the art.

Example 2 material 100 includes 25 percent cristobalite, 25 percent diatomaceous earth, 50 percent cellulose fibers, and a latex binder. Percentages are by weight. In other words, the filler material of Example 2 includes 50% cristobalite and 50% diatomaceous earth.

Figure 3:
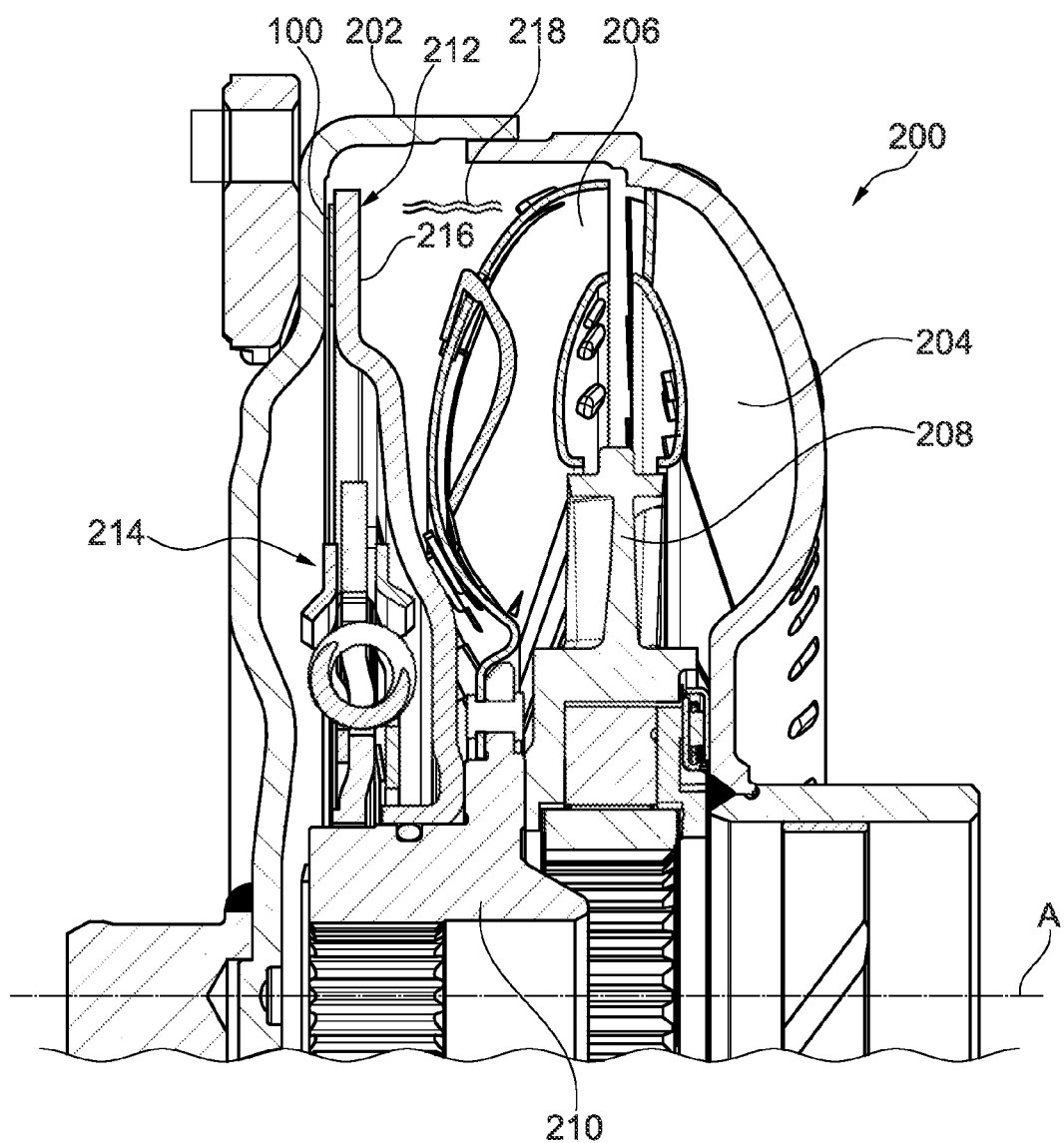

FIG. 3 is a partial cross-sectional view of example torque converter 200 including friction material 100 shown in FIG. 1. Torque converter 200 includes cover 202, impeller 204 connected to the cover, turbine 206 in fluid communication with the impeller, stator 208, output hub 210 arranged to non-rotatably connect to an input shaft (not shown) for a transmission, torque converter clutch 212, and vibration damper 214. Clutch 212 includes friction material 100 and piston 216. As is known in the art, piston 216 is displaceable to engage friction material 100 with piston 216 and cover 202 to transmit torque from cover 202 to output hub 210 through friction material 100 and piston 216. Fluid 218 is used to operate clutch 212.

Although a particular example configuration of torque converter 200 is shown in FIG. 3, it should be understood that the use of friction material 100 in a torque converter is not limited to a torque converter as configured in FIG. 3. That is, material 100 is usable in any clutch device, using friction material, for any torque converter configuration known in the art.

Figure 4:
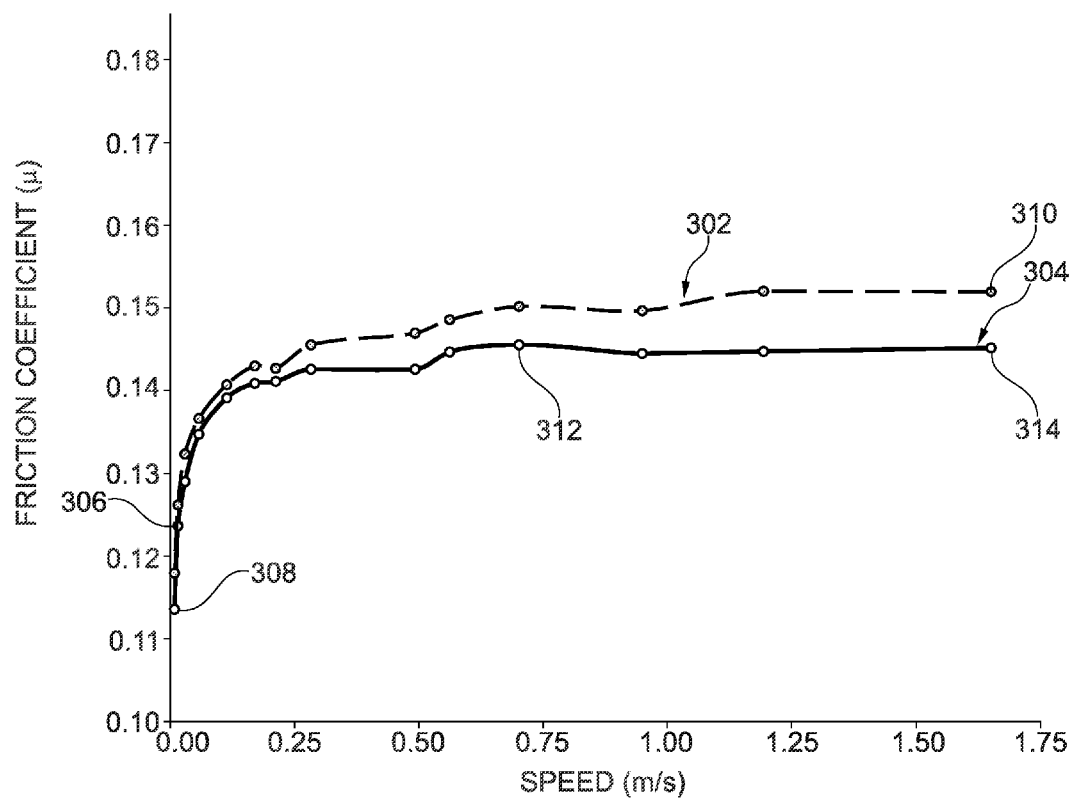

FIG. 4 is a graph plotting respective friction coefficients versus speed for known friction material and friction material 100 as formulated in Example 2 above. The speed in the x direction of the graph is the speed of the friction material with respect to a plate with which the friction material is in contact with. For example, the speed is the slip speed between the friction material and the plate. Plot 302 is for material 100 as formulated in Example 2 above wherein the filler material includes 50% cristobalite by weight relative to total weight of the filler material. Plot 304 is for a known friction material including fiber and a diatomaceous earth filler as in Example 1 above. Plots 302 and 304 are based on actual tests of the known friction material and friction material 100 at 90° C. and 2960 kPa. As noted above, it is desirable to maximize both static and dynamic friction for friction material for a clutch.

Advantageously, material 100 increases the static friction coefficient in comparison to known friction materials for clutches. For example for material 100, static coefficient 306 is at least 0.118 and static coefficient 308 for the known material is less, at approximately 0.113. In an example aspect material 100 has a static coefficient of at least 0.115.

Regarding the dynamic friction coefficient, advantageously, the friction coefficient for plot 302 continues to increase from point 306 to point 310 at approximately 1.70 m/s. In contrast, the friction coefficient for plot 304 flattens or decreases between point 312 at 0.70 m/s and point 314 at approximately 1.70 m/s.

In an example aspect, friction material 100 for a clutch comprises: plurality of fibers 102; filler composition 104 including: diatomaceous earth; and, cristobalite. In an example aspect, the cristobalite includes plurality of particles 108 characterized by a median particle size in a range from about 0.5 μm to about 5 μm. In an example aspect, friction material 100 further comprises a resin. In an example aspect, friction material 100 includes cristobalite in a range of from about 2% to about 20% by weight based on total weight of the friction material and has a static friction coefficient of at least 0.115.

Of course, changes and modifications to the above examples of the invention should be readily apparent to those having ordinary skill in the art, without departing from the spirit or scope of the invention as claimed. Although the invention is described by reference to specific preferred and/or example embodiments, it is clear that variations can be made without departing from the scope or spirit of the invention as claimed.

What we claim is:
1. A friction material for a clutch comprising:
a plurality of fibers;
a filler composition including:
diatomaceous earth; and, cristobalite including a plurality of particles characterized by a median particle size in a range from about 0.5 μm to about 5 μm; and, a resin; and, the friction material includes cristobalite in a range of from about 2% to about 20% by weight based on total weight of the friction material and a static friction coefficient of at least 0.115.

* * * * *